(12) United States Patent
Chen et al.

(10) Patent No.: US 11,150,199 B2
(45) Date of Patent: Oct. 19, 2021

(54) INSPECTION SYSTEM AND METHOD WITH VARIABLE-DIAMETER TRAVELING ROBOT FOR INSPECTION OF NATURAL GAS PIPELINE

(71) Applicant: Southwest Petroleum University, Sichuan (CN)

(72) Inventors: Zhen Chen, Sichuan (CN); Qin Li, Sichuan (CN); Yixuan He, Sichuan (CN); Nan Ji, Sichuan (CN); Chan Liu, Sichuan (CN); Ai Fu, Sichuan (CN); Boyuan Ma, Sichuan (CN); Wen He, Sichuan (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/025,668

(22) Filed: Sep. 18, 2020

(65) Prior Publication Data

US 2021/0278349 A1    Sep. 9, 2021

(30) Foreign Application Priority Data

Mar. 4, 2020    (CN) .......................... 202010145111.7

(51) Int. Cl.
| | | |
|---|---|---|
| *G01N 21/954* | (2006.01) | |
| *G01N 27/82* | (2006.01) | |
| *F16L 55/40* | (2006.01) | |
| *F16L 55/30* | (2006.01) | |
| *H04N 5/247* | (2006.01) | |

(Continued)

(52) U.S. Cl.
CPC ............ *G01N 21/954* (2013.01); *F16L 55/30* (2013.01); *F16L 55/40* (2013.01); *G01N 27/82* (2013.01); *H04N 5/2253* (2013.01); *H04N 5/2256* (2013.01); *H04N 5/247* (2013.01);

(Continued)

(58) Field of Classification Search
None
See application file for complete search history.

(56) References Cited

PUBLICATIONS

Yan et al. "Analysis of the Motion Mechanism of Actively Spirally Driven Pipe Robot", Jul. 23, 2018, 3rd Asia-Pacific Conference on Intelligent Robot Systems (ACIRS) (pp. 40-44). (Year: 2018).*

(Continued)

*Primary Examiner* — James M Anderson, II
(74) *Attorney, Agent, or Firm* — Bakerhostetler; Toni-Junell Herbert

(57) ABSTRACT

An inspection system and method with a variable-diameter traveling robot for inspection of a natural gas pipeline. The inspection system includes a pipeline inspection robot, a cable reel, a hydraulic pump and an information acquisition control terminal. The pipeline inspection robot includes an electronic cabin and a traveling mechanism. The electronic cabin includes a first digital camera, a second digital camera, a first digital camera mounting plate, a second digital camera mounting plate, a drum, a printed circuit board, a magnetic flux leakage probe, and a backup battery. The traveling mechanism includes a first traveling part, a second traveling part, an inner ratchet, an inner ratchet base, a slider, a long shaft, a hydraulic cylinder, and a hydraulic pipe. The cable reel includes a power line, a conversion module, and a communication line. The information acquisition control terminal is a mobile terminal having an analysis module and a control module.

9 Claims, 3 Drawing Sheets

(51) Int. Cl.
  *H04N 7/18* (2006.01)
  *H04N 5/225* (2006.01)
  *F16L 101/30* (2006.01)
(52) U.S. Cl.
  CPC ............ *H04N 7/18* (2013.01); *F16L 2101/30* (2013.01); *G01N 2021/9542* (2013.01)

(56) References Cited

PUBLICATIONS

Nassiraei et al., "Concept and Design of a Fully Autonomous Sewer Pipe Inspection Mobile Robot "KANTARO"", Apr. 14, 2007, IEEE International Conference on Robotics and Automation, pp. 136-143. (Year: 2007).*

* cited by examiner

INSPECTION SYSTEM AND METHOD WITH VARIABLE-DIAMETER TRAVELING ROBOT FOR INSPECTION OF NATURAL GAS PIPELINE

TECHNICAL FIELD

The present invention relates to the field of natural gas pipeline inspection, and in particular to an inspection system and method with a variable-diameter traveling robot for inspection of a natural gas pipeline.

BACKGROUND

Natural gas pipelines, also known as gas transportation pipelines, are intended to transport natural gas (including associated gas from oil fields) from exploitation sites or processing plants to urban gas distribution centers or industrial enterprise customers. The natural gas pipelines are utilized to transport a vast amount of natural gas on land. The natural gas pipelines account for about half of the total length of pipelines in the world. In China, most of modern natural gas transportation pipelines are concentrated in Sichuan Province, a major producer of natural gas.

The natural gas pipelines must be overhauled once every 1 to 3 years, and an ageing in-service natural gas pipeline may become dangerous. Therefore, it is of great significance to study inspection techniques for in-service natural gas pipelines.

An inspection system with a pipeline inspection robot currently used in the field of natural gas pipeline inspection usually has heavy equipment. The pipeline inspection robot used is usually driven by a motor. Its components, such as motor, cable, sensor, and cameras are often directly exposed without explosion protection There may be still a large amount of natural gas that is flammable and explosive left in an in-service natural gas pipeline when it is shut down, and it is highly likely that electric sparks are produced by the circuit components during the working process. Therefore, the currently employed natural gas pipeline inspection system would be at a certain risk of explosion during the inspection process. Due to complicated connections and disordered arrangements of the wiring of inspection components of the pipeline inspection robot, it would be difficult to disassemble, carry and assemble the entire inspection system with the pipeline inspection robot. When the pipeline inspection robot travels in a natural gas pipeline, the fouling on the inner wall of the pipeline may cause the wheels of the robot to skid, which affects the traveling efficiency. In short, the whole set of equipment is inconvenient to carry, complicated to assemble on site, and low in traveling efficiency, and would be at a risk of explosion during inspection.

SUMMARY

An objective of the present invention is to disclose an inspection system and method with a variable-diameter traveling robot for inspection of a natural gas pipeline to solve the problems mentioned above.

To achieve the above purpose, the present invention provides the following technical solutions.

An inspection system with a variable-diameter traveling robot for inspection of a natural gas pipeline includes a pipeline inspection robot, a cable reel, a hydraulic pump and an information acquisition control terminal, where the pipeline inspection robot includes an electronic cabin and a traveling mechanism;

the electronic cabin includes a first digital camera, a first digital camera bracket, a second digital camera, a second digital camera bracket, a first digital camera mounting plate, a second digital camera mounting plate, a drum, a printed circuit board, a magnetic flux leakage probe, a backup battery, and hydraulic pipe through-holes; the first digital camera and the first digital camera bracket are connected to the first digital camera mounting plate; the second digital camera and the second digital camera bracket are connected to the second digital camera mounting plate; the first digital camera mounting plate and the second digital camera mounting plate are connected through the drum; the magnetic flux leakage probe is connected to the drum; the printed circuit board is connected to the first camera mounting plate; the backup battery is connected to the printed circuit board; and the hydraulic pipe through-holes are formed in the first digital camera mounting plate and the second camera mounting plate;

the traveling mechanism includes a first traveling part, a second traveling part, an inner ratchet, an inner ratchet base, a slider, a long shaft, a first spring push rod, a second spring push rod, a hydraulic cylinder, and a hydraulic pipe; the first traveling part is connected to the first spring push rod which is connected to the hydraulic cylinder; the slider is connected to the first traveling part; the long shaft is connected to the slider and the second traveling part; the hydraulic cylinder is connected to the second traveling part; the hydraulic pipe is connected to the hydraulic cylinder; the hydraulic pipe is connected to the hydraulic pipe through-holes in the electronic cabin; the second traveling part is connected to the second spring push rod which is connected to the first camera mounting plate in the electronic cabin; the inner ratchet base is connected to the first traveling part and also to the second traveling part; and the inner ratchet is connected to the inner ratchet base;

the cable reel includes a power line connected to the printed circuit board, a conversion module for converting an electrical signal into a digital signal, and a communication line for transmitting data from the conversion module, where the communication line is connected to the conversion module; the conversion module is connected to the printed circuit board; and the power line is a two-core line;

the hydraulic pump, connected to the hydraulic pipe, is configured to provide a hydraulic oil to the hydraulic cylinder, so that the hydraulic cylinder is capable of working;

the information acquisition control terminal is a mobile terminal having an analysis module and a control module; the analysis module is configured to receive and analyze data of digital signals converted by the conversion module; and the control module is manually controlled to receive control instructions and storage instructions, send the control instructions to the cable reel through the communication line, execute corresponding inspection operations according to the control instructions and receive return data, with the data being stored by the storage instructions.

Further, the electronic cabin is filled with nitrogen.

Further, the electronic cabin is powered by the backup battery on the printed circuit board and the power line in the cable reel.

Further, the hydraulic cylinder is selected from a single-piston hydraulic cylinder with two hydraulic pipes and a double-piston hydraulic cylinder with two hydraulic pipes.

Further, the first digital camera and the second digital camera are connected to LED bulbs as light sources.

Further, the inner ratchet base is provided with a leaf spring and a chute, allowing the inner ratchet to slide vertically.

An inspection Method implemented by the above inspection system with a variable-diameter traveling robot for inspection of a natural gas pipeline includes the following steps:

S1, connecting the information acquisition control terminal to the cable reel and the hydraulic pump, connecting the hydraulic pipe to the hydraulic pump, and adjusting the diameter of the pipeline inspection robot to fit the size of the inner wall of the pipeline to be inspected, so that the pipeline inspection robot is placed in the pipeline to be inspected;

S2, receiving, by the hydraulic pump, control instructions from the information acquisition control terminal, and delivering the hydraulic oil to and recovering the hydraulic oil from the hydraulic cylinder through the hydraulic pipe, so that the pipeline inspection robot is able to travel in the pipeline, allowing the pipeline inspection robot to inspect a section of pipeline, where video data acquired by the first and second digital cameras and pipeline inner wall data acquired by the magnetic flux leakage probe in the pipeline inspection robot are converted into digital signals by the conversion module and transmitted to the cable reel through the communication line; the digital signals are transmitted by the cable reel to the analysis module of the information acquisition control terminal, and the pipeline inner wall data acquired by the magnetic flux leakage probe and the video data acquired by the first and second digital cameras are transmitted by the analysis module to the mobile terminal for display; and S3, manually controlling the control module to receive control instructions and storage instructions, where the control instructions are sent to the cable reel through the communication line, and transmitted to the conversion module of the pipeline inspection robot through the communication line; and then, the first and second digital cameras and the magnetic flux leakage probe in the electronic cabin of the pipeline inspection robot are invoked through the conversion module to operate according to the instructions;

the control module is capable of executing corresponding operations and storing the instructions, operations and received data according to the sent control instructions and storage instructions; and the analysis module also involves data processing, and is thus configured to process the received digital signals, perform analysis and calculation according to the pipeline inspection standards and generate a pipeline inspection report, and send the information of the pipeline inspection report to the control module.

Further, the control instructions include a control instruction for the hydraulic pump delivering the hydraulic oil, a control instruction for the hydraulic pump recovering the hydraulic oil, a control instruction for power supply switching between the backup battery and the power line, a control instruction for the Magnetic flux leakage probe, control instructions for the digital cameras, and LED bulb on-off instructions.

Further, the storage instructions include a magnetic flux leakage probe data storage instruction, a video storage instruction, a hydraulic pump working process storage instruction, and an inspection report storage instruction.

Compared with the prior art, the present invention has the following advantages:

1. A pipeline inspection robot used in the present invention is hydraulically driven by power that is mainly provided by a hydraulic oil delivered by a hydraulic pump outside the natural gas pipeline to a hydraulic pump through a hydraulic pipe. Only the hydraulic pump outside the natural gas pipeline needs to be driven electrically, and a hydraulic cylinder in the pipeline relies on the hydraulic oil for working with no electric spark produced. In this way, the possibility of explosion caused by electric sparks produced by a drive part when the pipeline inspection robot travels in the natural gas pipeline is reduced.

2. A hermetically sealed electronic cabin is detachably connected to the pipeline inspection robot by means of thread, thereby facilitating carrying and on-site assembly. A magnetic flux leakage probe can be spaced apart from the inner wall of the pipeline by a particular distance when inspecting the inner wall of the pipeline, and no coupling agent is needed, thereby ensuring the accuracy of the inspection. Digital cameras are also detachably connected to the magnetic flux leakage probe to facilitate carrying and on-site assembly. Before the pipeline inspection robot is placed in the natural gas pipeline, the electronic cabin is filled with nitrogen to reduce the internal oxygen concentration, thus reducing the possibility of explosion when there are electric sparks produced by circuit components.

3. The connections of all the wiring of the circuit components in the electronic cabin are gathered on a printed circuit board which also has additional positions for a backup battery, a power line and a communication line. When the electronic cabin is assembled, the circuit components and the wiring are just plugged into the specified positions on the printed circuit board, so that complicated circuit installation process is simplified. Other pipeline inspection components than the magnetic flux leakage probe and the digital cameras can also be added to the printed circuit board.

4. An inner ratchet may prevent the pipeline inspection robot from a skid when traveling in the natural gas pipeline, so that the pipeline robot can travel and stop stably in the pipeline. A leaf spring and a chute of an inner ratchet base may help the pipeline inspection robot cross obstacles such as pipeline welds; besides, the leaf spring also plays a role in preventing the pipeline inspection robot from a skid during the traveling process.

Figure 1:
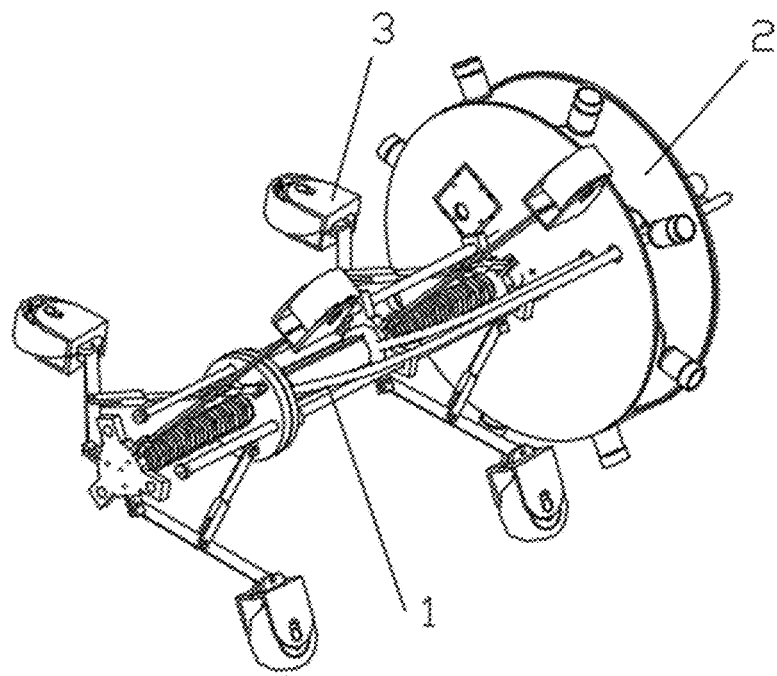
FIG. 1 is a schematic structural diagram of an inspection system with a variable-diameter traveling robot for inspection of a natural gas pipeline according to an example of the present invention.
Figure 2:
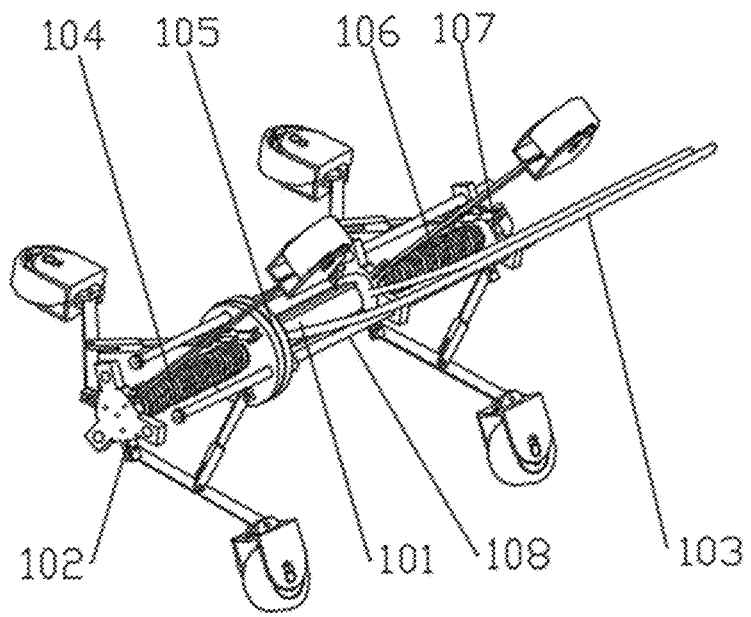
FIG. 2 is a schematic diagram of a mechanical structure of a traveling mechanism according to an example of the present invention.
Figure 3:
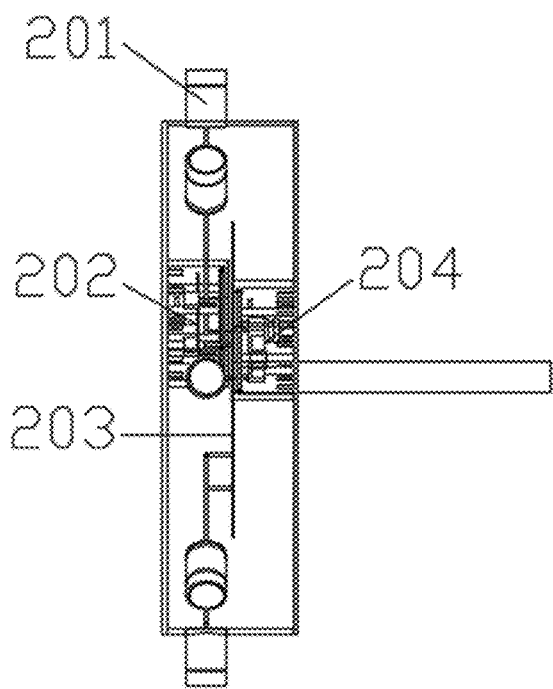
FIG. 3 is a schematic structural diagram of an electronic cabin according to an example of the present invention.
Figure 4:
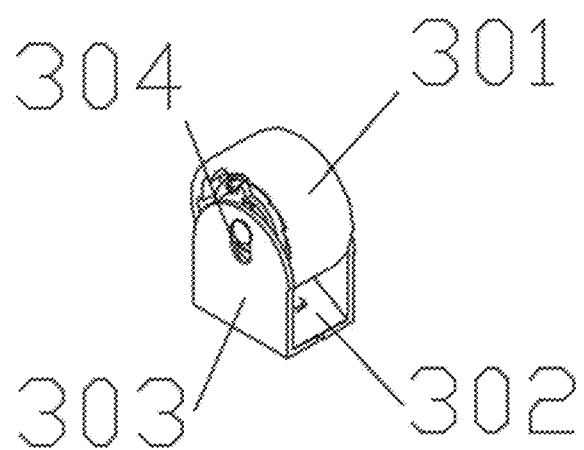
FIG. 4 is a schematic structural diagram of an inner ratchet and an inner ratchet base according to an example of the present invention.
Figure 5:
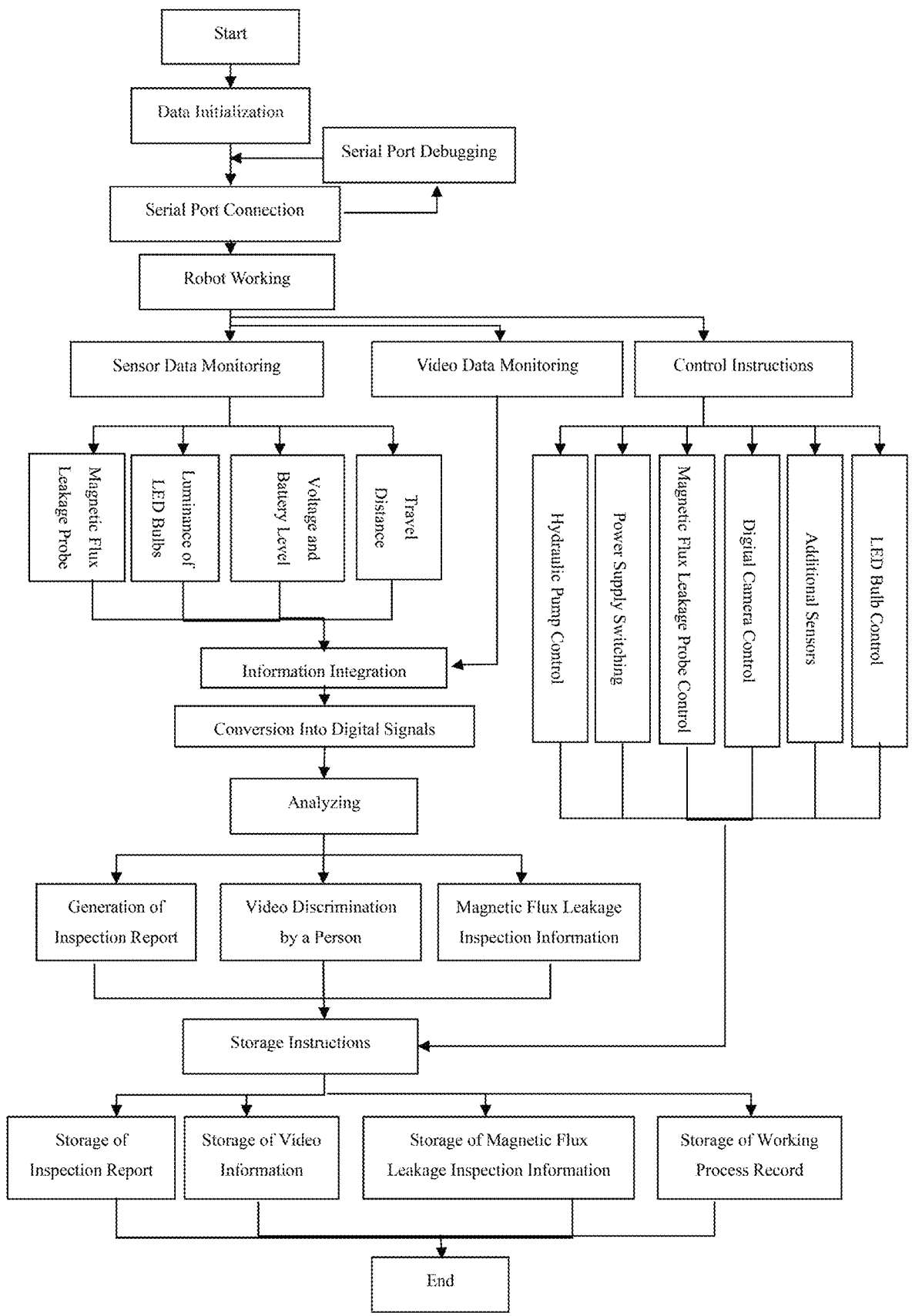
FIG. 5 is a flow chart of an inspection method according to an example of the present invention.

Numeral references: 1-traveling mechanism, 2-electronic cabin, 3-inner ratchet and inner ratchet base, 101-hydraulic cylinder, 102-first traveling part, 103-hydraulic pipe, 104-first spring push rod, 105-slider, 106-second spring push rod, 107-second traveling part, 108-long shaft, 201-magnetic flux leakage probe, 202-first digital camera, 203-printed circuit board, 204-second digital camera, 301-inner ratchet, 302-spring leaf, 303-inner ratchet base, and 304-chute.

DETAILED DESCRIPTION

The following clearly and completely describes the technical solutions in the examples of the present invention with reference to accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

The present invention provides an inspection system with a variable-diameter traveling robot for inspection of a natural gas pipeline, which includes a pipeline inspection robot, a cable reel, a hydraulic pump, and an information acquisition control terminal, where the pipeline inspection robot includes an electronic cabin 2 and a traveling mechanism 1.

The electronic cabin 2 includes a first digital camera 202, a first digital camera bracket, a second digital camera 204, a second digital camera bracket, a first digital camera mounting plate, a second digital camera mounting plate, a drum, a printed circuit board 203, a magnetic flux leakage probe 201, a backup battery, and hydraulic pipe through-holes. The first digital camera 202 and the first digital camera bracket are connected to the first digital camera mounting plate, and the second digital camera 204 and the second digital camera bracket are connected to the second digital camera mounting plate. The first digital camera mounting plate and the second digital camera mounting plate are connected through the drum. The magnetic flux leakage probe 201 is connected to the drum. The printed circuit board 203 is connected to the first camera mounting plate. The backup battery is connected to the printed circuit board. The hydraulic pipe through-holes are formed in the first digital camera mounting plate and the second camera mounting plate.

The traveling mechanism 1 includes a first traveling part 102, a second traveling part 107, an inner ratchet 301, an inner ratchet base 303, a slider 105, a long shaft 108, a first spring push rod 104, a second spring push rod 106, a hydraulic cylinder 101, and a hydraulic pipe 103. The first traveling part 102 is connected to the first spring push rod 104 which is connected to the hydraulic cylinder 101. The slider 105 is connected to the first traveling part 102. The long shaft 108 is connected to the slider 105 and the second traveling part 107. The hydraulic cylinder 101 is connected to the second traveling part 107. The hydraulic pipe 103 is connected to the hydraulic cylinder 101. The hydraulic pipe 103 is connected to the hydraulic pipe through-holes in the electronic cabin 2. The second traveling part 107 is connected to the second spring push rod 106 which is connected to the first camera mounting plate in the electronic cabin 2. The inner ratchet base 303 is connected to the first traveling part 102 and also to the second traveling part 107. The inner ratchet 301 is connected to the inner ratchet base 303.

The cable reel includes a power line connected to the printed circuit board 203, a conversion module for converting an electrical signal into a digital signal, and a communication line for transmitting data from the conversion module, where the communication line is connected to the conversion module which is connected to the printed circuit board 203; and the power line is a two-core line.

The hydraulic pump, connected to the hydraulic pipe 103, is configured to provide a hydraulic oil to the hydraulic cylinder 101, so that the hydraulic cylinder 101 can work.

The information acquisition control terminal is a mobile terminal having an analysis module and a control module. The analysis module is configured to receive and analyze data of digital signals converted by the conversion module. The control module is manually controlled to receive control instructions and storage instructions, send the control instructions to the cable reel through the communication line, execute corresponding inspection operations according to the control instructions and receive return data, with the data being stored by the storage instructions.

The electronic cabin 2 is filled with nitrogen for the purpose of reducing the proportion of oxygen in the electronic cabin, causing the concentration of oxygen to be lower than the explosive concentration of natural gas and thus reducing the possibility of explosion when there are electric sparks produced by the circuit components in the electronic cabin.

The electronic cabin 2 is powered by the backup battery on the printed circuit board 203 and the power line in the cable reel for the purpose of ensuring normal operation of each component in the electronic cabin and increasing the distance of natural gas pipeline inspection. Specifically, the electronic cabin is powered by the power line when the pipeline inspection robot enters the natural gas pipeline. Regarding a long-distance pipeline inspection, due to a voltage drop, the actual voltage supplied by the power line to the electronic cabin may be lower than the working voltages of the digital cameras and the magnetic flux leakage probe in the electronic cabin, rendering the digital cameras and the magnetic flux leakage probe unable to work normally. In this case, the backup battery is switched to power the electronic cabin.

The hydraulic cylinder 101 can be selected from a single-piston hydraulic cylinder with two hydraulic pipes and a double-piston hydraulic cylinder with two hydraulic pipes, for the purpose of providing power to drive the pipeline inspection robot to travel.

The first digital camera 202 and the second digital camera 204 are connected to LED bulbs as light sources. The digital cameras are OpenMV digital camera sensors. Since the OpenMV digital camera sensors are just provided with low-luminance light sources, it is difficult to observe the conditions in the natural gas pipeline. After they are connected with the LED bulbs, the conditions in the natural gas pipeline can be observed better.

The inner ratchet base 303 is provided with a leaf spring 302 and a chute 304, allowing the inner ratchet 301 to slide vertically, for the purpose of rendering the pipeline inspection robot able to cross obstacles to a certain extent. In case of an obstacle like a natural gas pipeline weld, the inner ratchet 301 may press against the leaf spring 302 and move down along the chute 304, and after crossing the weld, the leaf spring 302 may return to the initial state. Thus, crossing the weld on the inner wall of the pipeline is achieved.

In this example, the inner ratchet 301 is intended to prevent wheels from a skid on the inner wall of the pipeline, which is specifically realized as follows: as a driven wheel that rotates in one direction, the inner ratchet 301 may be mechanically self-locked when rotating in a reverse direction, rendering the inner ratchet 301 unable to rotate reversely and causing the friction between the inner ratchet 301 and the inner wall of the natural gas pipeline to change from rolling friction to sliding friction; and then the frictional force between the inner ratchet 301 and the inner wall of the natural gas pipeline will increase because the friction coefficient of the rolling friction between the inner ratchet 301 and the inner wall of the natural gas pipeline is smaller than that of the sliding friction, under the same force. The leaf spring 302 on the inner ratchet base 303 also prevents the inner ratchet 301 from a skid, thus allowing the pipeline inspection robot to travel more stably in the pipeline and improving the traveling efficiency.

Preferably, a connecting ring can be disposed at the joint of the printed circuit board 203 and the power line, and a connecting ring can also be disposed at the joint of the printed circuit board 203 and the communication line. A Dupont line, and a Dupont line pin header and a Dupont line female header that are pre-welded on the printed circuit board 203 may be used for the rest of the wiring in the electronic cabin 2. A hot melt adhesive may be applied to the joint of the Dupont line and the Dupont line pin header and the joint of the Dupont line and the Dupont line female header to form sealing rings. The sealing rings and the connecting rings are intended to prevent the power line, the communication line and the Wont line from disconnecting from the circuit due to vibration of the mechanical structure during the traveling process of the pipeline inspection robot.

Preferably, extended positions for electronic components are provided on the printed circuit board. 203 for mounting some sensors for acquiring other state parameters, such as a laser diameter measuring sensor, a laser distance measuring sensor, a temperature signal sensor for measuring the temperature in the pipeline, a humidity signal sensor for measuring the humidity in the pipeline, and a sensor for detecting the luminance of the LED bulbs.

Preferably, when the inspection system is assembled, the communication line and the power line can be bundled together with an electrical tape, and thus can be effectively prevented from being twisted together when the pipeline inspection robot travels in the pipeline.

An inspection method implemented by the above inspection system with a variable-diameter traveling robot for inspection of a natural gas pipeline includes the following steps:

S1, the information acquisition control terminal is connected to the cable reel and the hydraulic pump, and the hydraulic pipe is connected to the hydraulic pump. The diameter of the pipeline inspection robot is adjusted to fit the size of the inner wall of the pipeline to be inspected, so that the pipeline inspection robot is placed in the pipeline to be inspected.

S2, the hydraulic pump receives control instructions from the information acquisition control terminal, and delivers the hydraulic oil to and recovers the hydraulic oil from the hydraulic cylinder through the hydraulic pipe, so that the pipeline inspection robot can travel in the pipeline, allowing the pipeline inspection robot to inspect a section of pipeline.

The video data acquired by the first and second digital cameras and the pipeline inner wall data acquired by the magnetic flux leakage probe in the pipeline inspection robot are converted into digital signals by the conversion module and transmitted to the cable reel through the communication line. The digital signals are transmitted by the cable reel to the analysis module of the information acquisition control terminal, and the pipeline inner wall data acquired by the magnetic flux leakage probe and the video data acquired by the first and second digital cameras are transmitted by the analysis module to the mobile terminal for display.

S3, the control module is manually controlled to receive control instructions and storage instructions.

The control instructions are sent to the cable reel through the communication line, and then transmitted to the conversion module of the pipeline inspection robot through the communication line. Then, the first and second digital cameras and the magnetic flux leakage probe in the electronic cabin of the pipeline inspection robot are invoked through the conversion module to operate according to the instructions.

The control module is capable of executing corresponding operations and storing the instructions, operations and received data according to the sent control instructions and storage instructions.

The analysis module also involves data processing, and is thus configured to process the received digital signals, perform analysis and calculation according to the pipeline inspection standards and generate a pipeline inspection report, and send the information of the pipeline inspection report to the control module.

In further detail, the control instructions include a control instruction for the hydraulic pump delivering the hydraulic oil, a control instruction for the hydraulic pump recovering the hydraulic oil, a control instruction for power supply switching between the backup battery and the power line, a control instruction for the magnetic flux leakage probe, control instructions for the digital cameras, and LED bulb on-off instructions.

In further detail, the storage instructions include a magnetic flux leakage probe data storage instruction, a video storage instruction, a hydraulic pump working process storage instruction, and an inspection report storage instruction.

The backup battery for the whole system is a 12V DC battery, and the rest of the electrical parts are powered by 220V AC.

In this example, the conversion module is a microcontroller configured to convert the information detected by the digital cameras and the magnetic flux leakage probe into digital signals, and send the digital signals to the mobile terminal through the communication line connected with the conversion module. The mobile terminal is generally a computer to realize signal processing and storage. Since the pipeline inspection standards are industry standards and the corresponding calculation formulas are known to the public, the results of natural gas pipeline inspection can be calculated from the information in digital signals sent to the information acquisition control terminal according to the calculation formulas in the analysis module as long as the calculation formulas are set in the analysis module previously. Next, a natural gas pipeline inspection report may be generated, and then sent to the control module for storage by the storage instruction in the control module.

In this example, the inspection of the inner wall of the pipeline is mainly achieved by the magnetic flux leakage probe 201, and the digital cameras and additionally mounted sensors play an auxiliary role in the inspection of the inner wall of the pipeline. The working principle of the magnetic flux leakage probe 201 is as follows: after a ferromagnetic material to be inspected is magnetized by the magnetic flux leakage probe 201, the magnetic induction lines in the material will be restrained in the material if the interior of the material is continuous and uniform, and the magnetic flux will be parallel to the surface of the material with almost no magnetic field on the surface of the material to be inspected. If the magnetized material has a defect, it may have very small magnetic permeability and very large magnetic resistance, which will cause the magnetic flux in the magnetic circuit to be distorted with a change in its induction lines; as a result, part of the magnetic flux will pass directly through the defect or bypass the defect from the inside of the material, while part of the magnetic flux will leak into the space outside the surface of the material, thus resulting in magnetic flux leakage at the surface defect of the material. In this case, a magnetic flux leakage signal may be obtained by using a magnetic induction sensor on the magnetic flux leakage probe 201, and then sent to the information acquisition control terminal for processing. Moreover, the analysis of the magnetic flux density component of the magnetic flux leakage can provide a further understanding of corresponding defect characteristics such as width and depth. Compared with an ultrasonic pipeline inspection technique commonly used at present, the magnetic flux leakage probe 201 is relatively high in inspection accuracy during inspection in the natural gas pipeline for reasons of no need for a coupling agent between the probe and the inner wall of the pipeline, no need to be close to the inner wall of the pipeline, being less affected by the outside, and easily realized automation.

The control module and the analysis module are integrated as an application program installed on the computer. The application program can run on Windows, Linux, MacOS and other operating systems. A USB interface on a computer installed with the application program may be connected to a serial port on the cable reel and a serial port on the hydraulic pump by using a USB hub. The control module may control, through control instructions, the delivery and recovery of the hydraulic oil by the hydraulic pump, coiling and releasing of the power line and the communication line by the cable reel, the luminance of the LED bulbs, the focal lengths of the digital cameras, power supply switching between the backup battery and the power line, inspection by the magnetic flux leakage probe, etc. The control module may also store, through storage instructions, data from the magnetic flux leakage probe, videos, the working process of the hydraulic pump, an inspection report and so on. The analysis module may analyze and calculate received digital signals, and display received information on the computer. The analysis module may also process the received digital signals, perform analysis and calculation according to the pipeline inspection standards, and generate a pipeline inspection report, and send the information of the pipeline inspection report to the control module. The received information, such as video information, magnetic flux leakage inspection information, a pipeline inspection report, time and working time, may be displayed in the operation interface of the application program, and such information may be stored in the specified folder of the computer.

The above merely describes a preferred example of the present invention, but the protection scope of the present invention is not limited thereto. A person skilled in the art can easily conceive modifications or replacements within the technical scope of the present invention, and these modifications or replacements shall fall within the protection scope of the present invention. Therefore, the protection scope of the present invention should be subject to the protection scope defined by the claims.

What is claimed is:

1. An inspection system with a variable-diameter traveling robot for inspection of a natural gas pipeline, comprising a pipeline inspection robot, a cable reel, a hydraulic pump and an information acquisition control terminal, wherein the pipeline inspection robot comprises an electronic cabin (2) and a traveling mechanism (1);

the electronic cabin (2) comprises a first digital camera (202), a first digital camera bracket, a second digital camera (204), a second digital camera bracket, a first digital camera mounting plate, a second digital camera mounting plate, a drum, a printed circuit board (203), a magnetic flux leakage probe (201), a backup battery, and hydraulic pipe through-holes; the first digital camera (202) and the first digital camera bracket are connected to the first digital camera mounting plate; the second digital camera (204) and the second digital camera bracket are connected to the second digital camera mounting plate; the first digital camera mounting plate and the second digital camera mounting plate are connected through the drum; the magnetic flux leakage probe (201) is connected to the drum; the printed circuit board (203) is connected to the first camera mounting plate; the backup battery is connected to the printed circuit board; and the hydraulic pipe through-holes are formed in the first digital camera mounting plate and the second camera mounting plate;

the traveling mechanism (1) comprises a first traveling part (102), a second traveling part (107), an inner ratchet (301), an inner ratchet base (303), a slider (105), a long shaft (108), a first spring push rod (104), a second spring push rod (106), a hydraulic cylinder (101), and a hydraulic pipe (103); the first traveling part (102) is connected to the first spring push rod (104) which is connected to the hydraulic cylinder (101); the slider (105) is connected to the first traveling part (102); the long shaft (108) is connected to the slider (105) and the second traveling part (107); the hydraulic cylinder (101) is connected to the second traveling part (107); the hydraulic pipe (103) is connected to the hydraulic cylinder (101); the hydraulic pipe (103) is connected to the hydraulic pipe through-holes in the electronic cabin (2); the second traveling part (107) is connected to the second spring push rod (106) which is connected to the first camera mounting plate in the electronic cabin (2); the inner ratchet base (303) is connected to the first traveling part (102) and also to the second traveling part (107); and the inner ratchet (301) is connected to the inner ratchet base (303);

the cable reel comprises a power line connected to the printed circuit board (203), a conversion module for converting an electrical signal into a digital signal, and a communication line for transmitting data from the conversion module, wherein the communication line is connected to the conversion module; the conversion module is connected to the printed circuit board (203); and the power line is a two-core line;

the hydraulic pump, connected to the hydraulic pipe (103), is configured to provide a hydraulic oil to the hydraulic cylinder (101), so that the hydraulic cylinder (101) is capable of working;

the information acquisition control terminal is a mobile terminal; the mobile terminal is configured to receive and analyze data of digital signals converted by the conversion module, and the mobile terminal is further manually controlled to receive control instructions and storage instructions, send the control instructions to the cable reel through the communication line, execute corresponding inspection operations according to the control instructions and receive return data, with the data being stored by the storage instructions.

2. The inspection system with a variable-diameter traveling robot for inspection of a natural gas pipeline according to claim 1, wherein the electronic cabin (2) is filled with nitrogen.

3. The inspection system with a variable-diameter traveling robot for inspection of a natural gas pipeline according to claim 1, wherein the electronic cabin (2) is powered by the backup battery on the printed circuit board (203) and the power line in the cable reel.

4. The inspection system with a variable-diameter traveling robot for inspection of a natural gas pipeline according to claim 1, wherein the hydraulic cylinder (101) is selected from a single-piston hydraulic cylinder with two hydraulic pipes and a double-piston hydraulic cylinder with two hydraulic pipes.

5. The inspection system with a variable-diameter traveling robot for inspection of a natural gas pipeline according to claim 1, wherein the first digital camera (202) and the second digital camera (204) are connected to LED bulbs as light sources.

6. The inspection system with a variable-diameter traveling robot for inspection of a natural gas pipeline according to claim 1, wherein the inner ratchet base (303) is provided with a leaf spring (302) and a chute (304), allowing the inner ratchet (301) to slide vertically.

7. An inspection method implemented by the inspection system with a variable-diameter traveling robot for inspection of a natural gas pipeline according to claim 1, comprising the following steps:

S1, connecting the information acquisition control terminal to the cable reel and the hydraulic pump, connecting the hydraulic pipe to the hydraulic pump, and adjusting the diameter of the pipeline inspection robot to fit the size of the inner wall of the pipeline to be inspected, so that the pipeline inspection robot is placed in the pipeline to be inspected;

S2, receiving, by the hydraulic pump, control instructions from the information acquisition control terminal, and delivering the hydraulic oil to and recovering the hydraulic oil from the hydraulic cylinder through the hydraulic pipe, so that the pipeline inspection robot is able to travel in the pipeline, allowing the pipeline inspection robot to inspect a section of pipeline, wherein video data acquired by the first and second digital cameras and pipeline inner wall data acquired by the magnetic flux leakage probe in the pipeline inspection robot are converted into digital signals by the conversion module and transmitted to the cable reel through the communication line; the digital signals are transmitted by the cable reel to the mobile terminal, and the pipeline inner wall data acquired by the magnetic flux leakage probe and the video data acquired by the first and second digital cameras are transmitted to the mobile terminal for display; and S3, manually controlling the mobile terminal to receive control instructions and storage instructions, wherein the control instructions are sent to the cable reel through the communication line, and transmitted to the conversion module of the pipeline inspection robot through the communication line; and then, the first and second digital cameras and the magnetic flux leakage probe in the electronic cabin of the pipeline inspection robot are invoked through the conversion module to operate according to the instructions;

the mobile terminal is capable of executing corresponding operations and storing the instructions, operations and received data according to the sent control instructions and storage instructions; and the mobile terminal also involves data processing, and is thus configured to process the received digital signals, perform analysis and calculation according to the pipeline inspection standards and generate a pipeline inspection report.

8. The inspection method according to claim 7, wherein the control instructions comprise a control instruction for the hydraulic pump delivering the hydraulic oil, a control instruction for the hydraulic pump recovering the hydraulic oil, a control instruction for power supply switching between the backup battery and the power line, a control instruction for the magnetic flux leakage probe, control instructions for the digital cameras, and LED bulb on-off instructions.

9. The inspection method according to claim 7, wherein the storage instructions comprise a magnetic flux leakage probe data storage instruction, a video storage instruction, a hydraulic pump working process storage instruction, and an inspection report storage instruction.

* * * * *